(12) United States Patent
Masuda et al.

(10) Patent No.: US 11,306,649 B2
(45) Date of Patent: Apr. 19, 2022

(54) ENGINE SYSTEM

(71) Applicant: IHI CORPORATION, Tokyo (JP)

(72) Inventors: Yutaka Masuda, Tokyo (JP); Yasunori Ashikaga, Tokyo (JP); Yoshiyuki Umemoto, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 17/080,349

(22) Filed: Oct. 26, 2020

(65) Prior Publication Data

US 2021/0040881 A1 Feb. 11, 2021

Related U.S. Application Data

(63) Continuation of application No. PCT/JP2019/017597, filed on Apr. 25, 2019.

(30) Foreign Application Priority Data

Apr. 26, 2018 (JP) .............................. JP2018-085579

(51) Int. Cl.
| | |
|---|---|
| *F02B 37/16* | (2006.01) |
| *F01N 3/28* | (2006.01) |
| *F02B 75/04* | (2006.01) |
| *F02D 15/00* | (2006.01) |
| *F02D 41/02* | (2006.01) |

(52) U.S. Cl.
CPC .............. *F02B 37/168* (2013.01); *F01N 3/28* (2013.01); *F02B 75/04* (2013.01); *F02D 15/00* (2013.01); *F02D 41/0235* (2013.01); *F02D 2200/0802* (2013.01)

(58) Field of Classification Search
CPC .......... F01N 3/28; F02B 37/168; F02B 75/04; F02B 75/045; F02D 15/00; F02D 41/0235
USPC ........................ 60/605.1; 123/568.21–568.32
See application file for complete search history.

(56) References Cited

U.S. PATENT DOCUMENTS

| | | | |
|---|---|---|---|
| 5,682,854 A | 11/1997 | Ozawa | |
| 2002/0134081 A1* | 9/2002 | Shiraishi | F02D 13/0249 60/602 |
| 2007/0215126 A1 | 9/2007 | Shiraishi et al. | |
| 2007/0251216 A1 | 11/2007 | Easley, Jr. et al. | |

(Continued)

FOREIGN PATENT DOCUMENTS

| | | |
|---|---|---|
| EP | 2687707 A2 | 1/2014 |
| EP | 3677762 A1 | 7/2020 |

(Continued)

OTHER PUBLICATIONS

International Search Report for PCT/JP2019/ with its English translation dated Jul. 23, 2019, 4 pages.

(Continued)

*Primary Examiner* — Devon C Kramer
*Assistant Examiner* — Kelsey L Stanek
(74) *Attorney, Agent, or Firm* — Rothwell, Figg, Ernst & Manbeck, P.C.

(57) ABSTRACT

Provided is an engine system including: a bypass pipe (bypass flow passage) connecting an upstream side and a downstream side of the turbine on an exhaust flow passage; a bypass valve configured to open and close the bypass flow passage; and a catalytic activation controller configured to control the bypass valve and a compression ratio of a combustion chamber.

7 Claims, 7 Drawing Sheets

(56) References Cited

U.S. PATENT DOCUMENTS

| | | | |
|---|---|---|---|
| 2009/0187329 A1 | 7/2009 | Akihisa et al. | |
| 2014/0067236 A1* | 3/2014 | Henry | F02D 41/1446 701/104 |
| 2014/0338326 A1* | 11/2014 | Sugihara | F02D 35/0023 60/601 |
| 2015/0136089 A1* | 5/2015 | Tanaka | F02B 75/04 123/48 R |
| 2016/0319739 A1* | 11/2016 | Yamada | F02B 75/045 |
| 2018/0187612 A1* | 7/2018 | Takahashi | F02D 19/0673 |
| 2019/0136754 A1* | 5/2019 | Brin | F02D 41/024 |

FOREIGN PATENT DOCUMENTS

| | | |
|---|---|---|
| JP | S62-072450 U | 5/1987 |
| JP | 2003-065121 A | 3/2003 |
| JP | 2004-278415 A | 10/2004 |
| JP | 2004278415 A * | 10/2004 |
| JP | 3719611 B2 | 9/2005 |
| JP | 2007-077828 A | 3/2007 |
| JP | 2007-247447 A | 9/2007 |
| JP | 2007-303423 A | 11/2007 |
| JP | 2009-215995 A | 9/2009 |
| JP | 2009215995 A * | 9/2009 |
| JP | 2009-281303 A | 12/2009 |
| JP | 2012-031839 A | 2/2012 |
| JP | 4998336 B2 | 8/2012 |
| JP | 2014-020375 A | 2/2014 |
| JP | 2016-011632 A | 1/2016 |
| JP | 2016-125417 A | 7/2016 |
| JP | 2017-101676 A | 6/2017 |
| JP | 2017-214893 A | 12/2017 |
| KR | 10-2012-0015386 A | 2/2012 |

OTHER PUBLICATIONS

The extended European search report dated Dec. 16, 2021 in corresponding EP Patent Application No. 19792725.4 (8 pages).

* cited by examiner

ENGINE SYSTEM

CROSS REFERENCE TO RELATED APPLICATIONS

This application is a continuation application of International Application No. PCT/JP2019/017597, filed on Apr. 25, 2019, which claims priority to Japanese Patent Application No. 2018-085579, filed on Apr. 26, 2018, the entire contents of which are incorporated by reference herein.

BACKGROUND ART

Technical Field

The present disclosure relates to an engine system.

Related Art

In a crosshead type engine of Patent Literature 1, an ejection valve configured to discharge air in a scavenging chamber is provided. In Patent Literature 1, the ejection valve is opened to lower scavenging pressure in the scavenging chamber, thereby lowering efficiency of an engine and raising the temperature of exhaust gas. With this, the temperature of the exhaust gas can be raised to a temperature at which a selective catalytic reduction (SCR) device is activated.

CITATION LIST

Patent Literature

Patent Literature 1: JP 2017-101676 A

SUMMARY

Technical Problem

However, when the efficiency of the engine is lowered in order to raise the temperature of the exhaust gas, fuel efficiency is degraded.

The present disclosure has an object to provide an engine system capable of improving fuel efficiency of an engine.

Solution to Problem

In order to solve the above-mentioned problem, an engine system of the present disclosure includes: a combustion chamber to which an intake flow passage and an exhaust flow passage are connected; an exhaust gas purification catalyst provided to the exhaust flow passage; a turbocharger including: a turbine arranged on the exhaust flow passage; and a compressor arranged on the intake flow passage; a bypass flow passage for connecting an upstream side and a downstream side of the turbine on the exhaust flow passage; a bypass valve configured to open and close the bypass flow passage; and a controller configured to control the bypass valve and a compression ratio of the combustion chamber.

The engine system may further include a compression ratio varying mechanism configured to vary a top dead center position of a piston in a cylinder.

The engine system may further include a detector configured to detect a temperature of the exhaust gas purification catalyst, and when the temperature of the exhaust gas purification catalyst is smaller than a first threshold value, the controller may control the bypass valve to an open state and control the compression ratio to a high compression ratio larger than a minimum compression ratio.

When the temperature of the exhaust gas purification catalyst is equal to or larger than the first threshold value, the controller may control the bypass valve to a closed state and maintain the high compression ratio.

When the temperature of the exhaust gas purification catalyst is equal to or larger than a second threshold value larger than the first threshold value, the controller may control the bypass valve to the closed state and control the compression ratio to a low compression ratio smaller than the high compression ratio.

The engine system may include a detector configured to detect the temperature of the exhaust gas purification catalyst, and when the temperature of the exhaust gas purification catalyst is smaller than the first threshold value, the controller may control a fuel injection timing to a second fuel injection timing later than a first fuel injection timing and control the compression ratio to a high compression ratio larger than a minimum compression ratio.

When the temperature of the exhaust gas purification catalyst is equal to or larger than the first threshold value, the controller may control the fuel injection timing to the first fuel injection timing and maintain the high compression ratio.

When the temperature of the exhaust gas purification catalyst is equal to or larger than the second threshold value larger than the first threshold value, the controller may control the fuel injection timing to the first fuel injection timing and control the compression ratio to a low compression ratio smaller than the high compression ratio.

Effects of Disclosure

According to the engine system of the present disclosure, it is possible to improve the fuel efficiency of the engine.

DESCRIPTION OF EMBODIMENT

Figure 1:
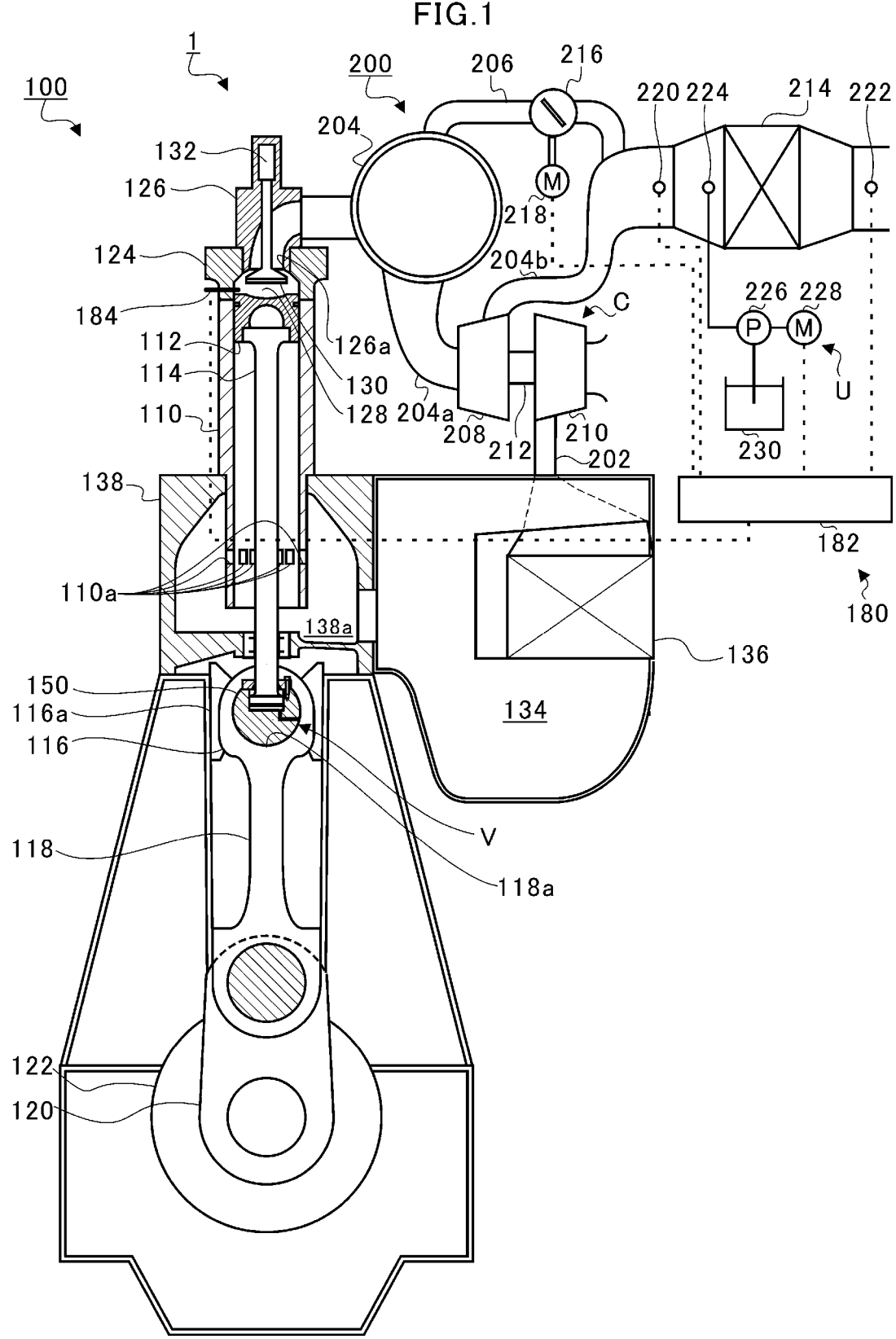
FIG. 1 is an explanatory view for illustrating an overall configuration of an engine system.

Now, with reference to the attached drawings, an embodiment of the present disclosure is described in detail. The dimensions, materials, and other specific numerical values represented in the embodiment are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is an explanatory view for illustrating an overall configuration of an engine system 1. As illustrated in FIG. 1, the engine system 1 includes an engine 100 and an air intake/exhaust system 200. The engine 100 includes a cylinder 110, a piston 112, a piston rod 114, a crosshead 116, a connecting rod 118, a crankshaft 120, a flywheel 122, a cylinder cover 124, an exhaust valve cage 126, a combustion chamber 128, an exhaust valve 130, an exhaust valve drive device 132, a scavenge reservoir 134, a cooler 136, and a cylinder jacket 138.

The air intake/exhaust system 200 includes an intake pipe (intake flow passage) 202, an exhaust pipe (exhaust flow passage) 204, a bypass pipe (bypass flow passage) 206, and a turbocharger C. The turbocharger C includes a turbine 208, a compressor 210, and a turbine shaft 212. The turbine 208 is arranged on the exhaust pipe (exhaust flow passage) 204. The compressor 210 is arranged on the intake pipe (intake flow passage) 202. The turbine 208 and the compressor 210 are connected (coupled) to each other by the turbine shaft 212. The compressor 210 rotates integrally with the turbine 208.

The piston 112 is provided in the cylinder 110. The piston 112 is configured to reciprocate inside the cylinder 110. One end of the piston rod 114 is mounted to the piston 112. A crosshead pin 150 of the crosshead 116 is coupled to another end of the piston rod 114. The crosshead 116 is configured to reciprocate together with the piston 112. A movement of the crosshead 116 in a right-and-left direction (a direction perpendicular to a stroke direction of the piston 112) of FIG. 1 is restricted by a guide shoe 116a.

The crosshead pin 150 is axially supported by a crosshead bearing 118a provided at one end of the connecting rod 118. The crosshead pin 150 is configured to support one end of the connecting rod 118. The another end of the piston rod 114 and the one end of the connecting rod 118 are connected to each other through intermediation of the crosshead 116.

Another end of the connecting rod 118 is coupled to the crankshaft 120. The crankshaft 120 is rotatable with respect to the connecting rod 118. When the crosshead 116 reciprocates as the piston 112 reciprocates, the crankshaft 120 rotates.

The flywheel 122 is mounted to the crankshaft 120. Rotations of the crankshaft 120 and the like are stabilized by an inertia of the flywheel 122. The cylinder cover 124 is provided at a top end of the cylinder 110. The exhaust valve cage 126 is inserted through the cylinder cover 124.

One end of the exhaust valve cage 126 faces the piston 112. An exhaust port 126a is opened at the one end of the exhaust valve cage 126. The exhaust port 126a is opened to the combustion chamber 128. The exhaust chamber 128 is formed inside the cylinder 110 so as to be surrounded by the cylinder cover 124, the cylinder 110, and the piston 112.

A valve body of the exhaust valve 130 is located in the combustion chamber 128. The exhaust valve drive device 132 is mounted to a rod portion of the exhaust valve 130. The exhaust valve drive device 132 is arranged in the exhaust valve cage 126. The exhaust valve drive device 132 moves the exhaust valve 130 in a stroke direction of the piston 112.

When the exhaust valve 130 moves toward the piston 112 side, the exhaust port 126a is opened. When the exhaust port 126a is opened, an exhaust gas generated in the cylinder 110 after the combustion is discharged from the exhaust port 126a. After the exhaust gas is discharged, when the exhaust valve 130 moves toward the exhaust valve cage 126 side, the exhaust port 126a is closed.

The exhaust pipe 204 is mounted to the exhaust valve cage 126. An inside of the exhaust pipe 204 communicates with the exhaust port 126a. The turbine 208 and an SCR device (exhaust gas purification catalyst) 214 are arranged on the exhaust pipe 204. The turbine 208 is arranged more on an upstream side of the exhaust pipe 204 than the SCR device 214. The exhaust gas discharged from the exhaust port 126a rotates the turbine 208 in the course of flowing inside the exhaust pipe 204. The SCR device 214 processes the exhaust gas to purify the exhaust gas. The SCR device 214 reduces nitrogen oxide (NOx) contained in the exhaust gas.

A bypass pipe 206 is mounted to the exhaust pipe 204. The exhaust pipe 204 includes an upstream-side exhaust pipe (upstream-side exhaust flow passage) 204a on an upstream side of the turbine 208 and a downstream-side exhaust pipe (downstream-side exhaust flow passage) 204b on a downstream side of the turbine 208. The bypass pipe 206 detours around the turbine 208 and connects the upstream-side exhaust pipe (upstream-side exhaust flow passage) 204a and the downstream-side exhaust pipe (downstream-side exhaust flow passage) 204b to each other. An end portion of the bypass pipe 206 on the upstream side is connected to the exhaust pipe 204 between the exhaust port 126a and the turbine 208. An end portion of the bypass pipe 206 on the downstream side is connected to the exhaust pipe 204 between the turbine 208 and the SCR device 214. A bypass valve 216 is provided inside the bypass pipe 206. The bypass valve 216 is formed of, for example, a butterfly valve. The bypass valve 216 is driven by a motor 218 and is configured to open and close the bypass pipe 206.

A temperature detection sensor 220, a urea-water supplying mechanism U, and a NOx detection sensor 222 are arranged in the exhaust pipe 204. The temperature detection sensor 220 is arranged in the exhaust pipe 204 between the turbine 208 and the SCR device 214. More specifically, the temperature detection sensor 220 is arranged in the exhaust pipe 204 between the end portion (outlet end) of the bypass pipe 206 on the downstream side and the SCR device 214. The temperature detection sensor 220 is configured to detect a temperature of the exhaust gas having passed through the turbine 208 or the bypass pipe 206, or a temperature of the SCR device 214. The position of the temperature detection sensor 220 is not limited to the position mentioned above. The temperature detection sensor 220 may be provided to, for example, the SCR device 214. In such a case, the temperature detection sensor 220 detects the temperature of the SCR device 214.

The urea-water supplying mechanism U includes a urea-water injection nozzle 224, a urea-water pump 226, a motor 228, and a urea-water tank 230. The urea-water supplying mechanism U is configured to blow urea, which serves as a reducing agent, into the exhaust gas. Through the addition of the urea into the exhaust gas, the SCR device 214 selectively allows NOx to react, thereby being capable of resolving the NOx into nitrogen and water.

The urea-water injection nozzle 224 is arranged in the exhaust pipe 204 between the turbine 208 and the SCR device 214. More specifically, the urea-water injection nozzle 224 is arranged in the exhaust pipe 204 between the end portion (outlet end) of the bypass pipe 206 on the downstream side and the SCR device 214. The urea-water injection nozzle 224 is arranged more on the downstream side than the temperature detection sensor 220.

The urea-water tank 230 is configured to store urea water. The urea-water pump 226 is driven by a motor 228 to pressurize the urea water stored in the urea-water tank 230 and deliver the pressurized urea water to the urea-water injection nozzle 224. The urea-water injection nozzle 224 is configured to spray the urea water, which has been supplied by the urea-water pump, toward the SCR device 214.

The NOx detection sensor 222 is arranged in the exhaust pipe 204 more on the downstream side than the SCR device 214. The NOx detection sensor 222 is configured to detect an amount of the nitrogen oxide (NOx) contained in the exhaust gas having passed through the SCR device 214. The exhaust gas having been discharged from the exhaust port 126a is supplied to the turbine 208 of the turbocharger C or the bypass pipe 206 through the exhaust pipe 204. After that, the exhaust gas passes through the SCR device 214 and is discharged to the outside.

The intake pipe 202 is mounted to the scavenge reservoir 134. An inside of the intake pipe 202 communicates with the scavenge reservoir 134, and outside air (active gas) is sucked and guided to the scavenge reservoir 134. The compressor 210 is arranged on the intake pipe 202. The compressor 210 rotates along with the rotation of the turbine 208 to pressurize the active gas. In this state, the active gas is, for example, air. The pressurized active gas is cooled by the cooler 136 in the scavenge reservoir 134. A bottom end of the cylinder 110 is surrounded by the cylinder jacket 138. A scavenge chamber 138a is formed inside the cylinder jacket 138. The active gas after the cooling is forcibly fed into the scavenge chamber 138a.

Scavenging ports 110a are formed on a bottom end side of the cylinder 110. The scavenging port 110a is a hole passing from an inner peripheral surface to an outer peripheral surface of the cylinder 110. A plurality of scavenging ports 110a are formed at intervals in a circumferential direction of the cylinder 110.

When the piston 112 moves toward a bottom dead center position side with respect to the scavenging ports 110a, the active gas is sucked from the scavenging ports 110a into the cylinder 110 by a pressure difference between the scavenge chamber 138a and the inside of the cylinder 110.

A gas fuel injection valve (not shown) is provided in a vicinity of the scavenging ports 110a, or a portion of the cylinder 110 from the scavenging ports 110a to the cylinder cover 124. The fuel gas is injected from the gas fuel injection valve, and then flows into the cylinder 110.

A pilot injection valve (not shown) is provided in the cylinder cover 124. An appropriate amount of fuel oil is injected from the pilot injection valve into the combustion chamber 128. The fuel oil is vaporized, ignited, and combusted through heat of the combustion chamber 128, thereby increasing the temperature in the combustion chamber 128. Mixture of the fuel gas and the active gas compressed by the piston 112 is ignited by the heat of the combustion chamber 128, and is combusted. The piston 112 is configured to reciprocate through an expansion pressure generated by the combustion of the fuel gas (mixture). A pressure detection sensor 184 is provided in the cylinder cover 124. The pressure detection sensor 184 is configured to detect a pressure in the cylinder 110 (combustion chamber 128).

The pressure detection sensor 184, the temperature detection sensor 220, and the NOx detection sensor 222 are connected to a catalytic activation controller 182 described later, and are configured to output detection values to the catalytic activation controller 182. Moreover, the motors 218 and 228 are connected to the catalytic activation controller 182, and driving of each of the motors 218 and 228 is controlled by the catalytic activation controller 182.

In this case, the fuel gas is produced by, for example, gasifying a liquefied natural gas (LNG). However, the fuel gas is not limited to those produced by gasifying the LNG, and there may also be used fuel gas produced by gasifying, for example, a liquefied petroleum gas (LPG), a light oil, or a heavy oil.

A compression ratio varying mechanism V is provided to the engine 100. A catalytic activation control device 180 configured to activate the SCR device 214 (catalyst) is provided to the engine system 1. The catalytic activation control device 180 includes detectors such as the pressure detection sensor 184, the temperature detection sensor 220, and the NOx detection sensor 222 and the catalytic activation controller 182. The catalytic activation controller 182 is configured to control an opening degree of the bypass valve 216 and a compression ratio of the combustion chamber 128 (compression ratio varying mechanism V) based on the signals obtained from the detectors such as the pressure detection sensor 184, the temperature detection sensor 220, and the NOx detection sensor 222. A detailed description is now given of the compression ratio varying mechanism V and the catalytic activation control device 180.

Figure 2A:
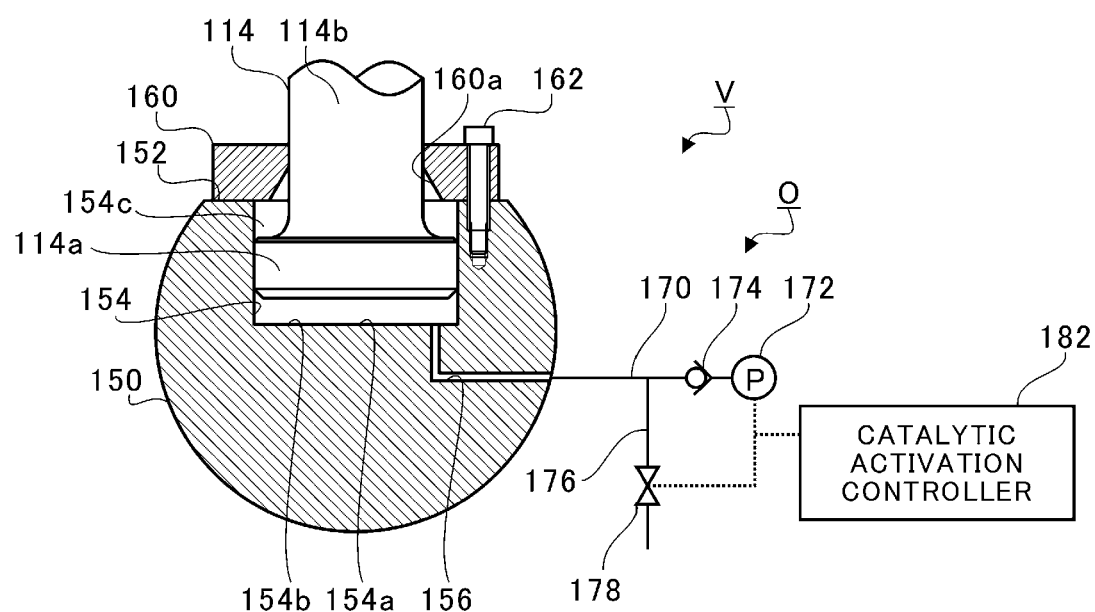
FIG. 2A is an extracted view for illustrating a coupling portion between a piston rod and a crosshead pin.
Figure 2B:
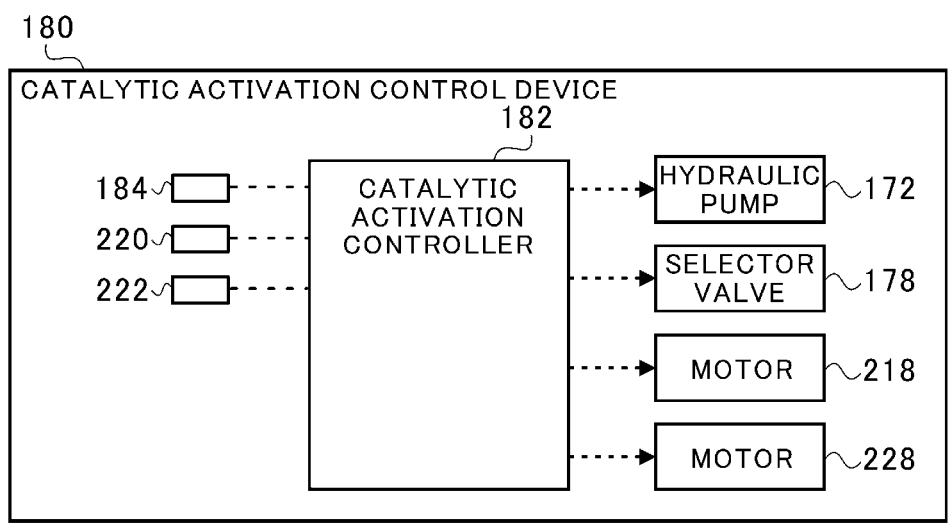
FIG. 2B is a functional block diagram for illustrating a catalytic activation control device.

FIG. 2A and FIG. 2B are a schematic configuration view and a schematic configuration diagram for illustrating the compression ratio varying mechanism V and the catalyst activation control device 180, respectively. FIG. 2A is an extracted view for illustrating a coupling portion between the piston rod 114 and the crosshead pin 150. FIG. 2B is a functional block diagram for illustrating the catalyst activation control device 180. As illustrated in FIG. 2A, a flat surface portion 152 is formed on an outer peripheral surface of the crosshead pin 150 on the piston 112 side. The flat surface portion 152 extends in a direction substantially perpendicular to the stroke direction of the piston 112.

A pin hole 154 is formed in the crosshead pin 150. The pin hole 154 is opened in the flat surface portion 152. The pin hole 154 extends from the flat surface portion 152 toward the crankshaft 120 side (bottom side of FIG. 2A) along the stroke direction.

A cover member 160 is provided on the flat surface portion 152 of the crosshead pin 150. The cover member 160 is mounted to the flat surface portion 152 of the crosshead pin 150 by a fastening member 162. The cover member 160 covers the pin hole 154. A cover hole 160a passing in the stroke direction is provided in the cover member 160.

The piston rod 114 includes a large-diameter portion 114a and a small-diameter portion 114b. An outer diameter of the large-diameter portion 114a is larger than an outer diameter of the small-diameter portion 114b. The large-diameter portion 114a is formed at the another end of the piston rod 114. The large-diameter portion 114a is inserted into the pin hole 154 of the crosshead pin 150. The small-diameter portion 114b is formed on one end side of the piston rod 114 with respect to the large-diameter portion 114a. The small-diameter portion 114b is inserted into the cover hole 160a of the cover member 160.

A hydraulic chamber 154a is formed inside the pin hole 154. The pin hole 154 is partitioned by the large-diameter portion 114a in the stroke direction. The hydraulic chamber 154a is a space defined on a bottom surface 154b side of the pin hole 154 partitioned by the large-diameter portion 114a.

The compression ratio varying mechanism V includes a hydraulic pressure adjustment mechanism O. The hydraulic pressure adjustment mechanism O includes a hydraulic pipe 170, a hydraulic pump 172, a check valve 174, a branch pipe 176, and a selector valve 178.

One end of an oil passage 156 is opened in the bottom surface 154b of the pin hole 154. Another end of the oil passage 156 is opened to an outside of the crosshead pin 150. The hydraulic pipe 170 is connected to the another end of the oil passage 156. The hydraulic pump 172 communicates with the hydraulic pipe 170. The hydraulic pump 172 supplies working oil supplied from an oil tank (not shown) to the hydraulic pipe 170 based on an instruction from the catalyst activation controller 182. The check valve 174 is provided between the hydraulic pump 172 and the oil passage 156. A flow of working oil flowing from the oil passage 156 side toward the hydraulic pump 172 is suppressed by the check valve 174. The working oil is forcibly fed into the hydraulic chamber 154a from the hydraulic pump 172 through the oil passage 156.

The branch pipe 176 is connected to the hydraulic pipe 170 between the oil passage 156 and the check valve 174. The selector valve 178 is provided to the branch pipe 176. The selector valve 178 is, for example, an electromagnetic valve. The selector valve 178 is controlled to an open state or a closed state based on an instruction from the catalyst activation controller 182. The selector valve 178 is closed during operation of the hydraulic pump 172. When the selector valve 178 is opened while the hydraulic pump 172 is stopped, the working oil is discharged from the hydraulic chamber 154a toward the branch pipe 176 side. The selector valve 178 communicates with the oil tank (not shown) on a side of the selector valve 178 opposite to the oil passage 156. The discharged working oil is retained in the oil tank. The oil tank is configured to supply the working oil to the hydraulic pump 172.

The large-diameter portion 114a is configured to slide on an inner peripheral surface of the pin hole 154 in the stroke direction in accordance with an oil amount of the working oil in the hydraulic chamber 154a. As a result, the piston rod 114 moves in the stroke direction. The piston 112 moves together with the piston rod 114. A top dead center position of the piston 112 becomes variable through the movement of the piston rod 114 in the stroke direction.

The compression ratio varying mechanism V includes the hydraulic chamber 154a and the large-diameter portion 114a of the piston rod 114. The compression ratio varying mechanism V moves the top dead center position of the piston 112 so that the compression ratio is variable. The compression ratio varying mechanism V can vary the top dead center position and the bottom dead center position of the piston 112 in the cylinder 110 of the engine 100 through adjustment of the oil amount of the working oil to be supplied to the hydraulic chamber 154a.

Description has been given of the case in which the one hydraulic chamber 154a is provided. However, a space 154c on the cover member 160 side of the pin hole 154 partitioned by the large-diameter portion 114a may also be a hydraulic chamber. This hydraulic chamber may be used together with the hydraulic chamber 154a or may be used individually.

In FIG. 2B, a configuration relating to control for the compression ratio varying mechanism V is mainly illustrated. As illustrated in FIG. 2B, the catalyst activation control device 180 includes the catalyst activation controller 182. The catalyst activation control device 180 is formed of, for example, an engine control unit (ECU). The catalyst activation control device 180 is formed of a central processing unit (CPU), a ROM storing programs and the like, a RAM serving as a work area, and the like, and is configured to control the entire engine system 1.

The catalytic activation controller 182 is configured to control the hydraulic pump 172 and the selector valve 178 based on the signal obtained from the pressure detection sensor 184 to move the top dead center position of the piston 112. The catalytic activation controller 182 is configured to control a geometric compression ratio of the engine 100. The catalytic activation controller 182 is configured to control the motor 218 based on the signals obtained from the temperature detection sensor 220 and the NOx detection sensor 222, to thereby control the opening degree of the bypass valve 216. The catalytic activation controller 182 is configured to control a flow rate of the exhaust gas passing through the bypass pipe 206 and the turbine 208. The catalytic activation controller 182 is configured to control the motor 228 based on the signals obtained from the temperature detection sensor 220 and the NOx detection sensor 222, to thereby control the urea-water pump 226. The catalytic activation controller 182 is configured to control an amount of the urea water to be added to the exhaust gas (that is, to be supplied to the SCR device 214).

Figure 3A:
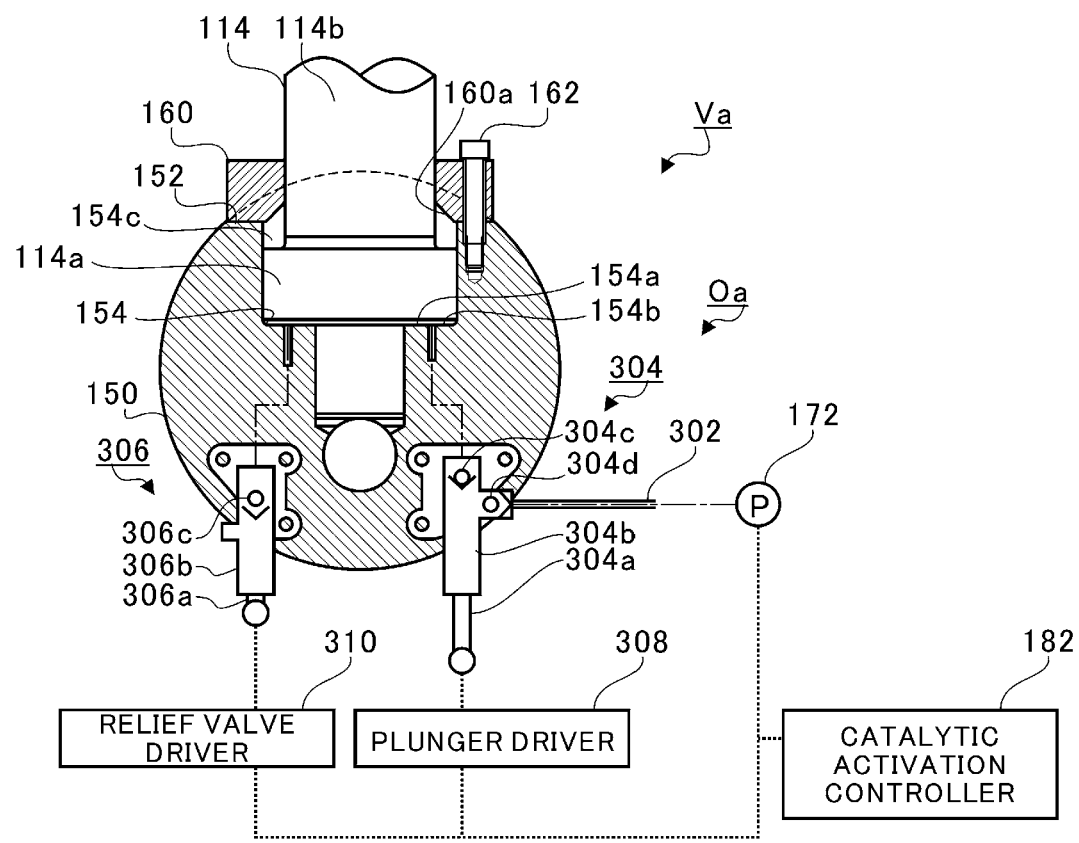
FIG. 3A is an extracted view for illustrating the coupling portion between the piston rod and the crosshead pin in a modification example.
Figure 3B:
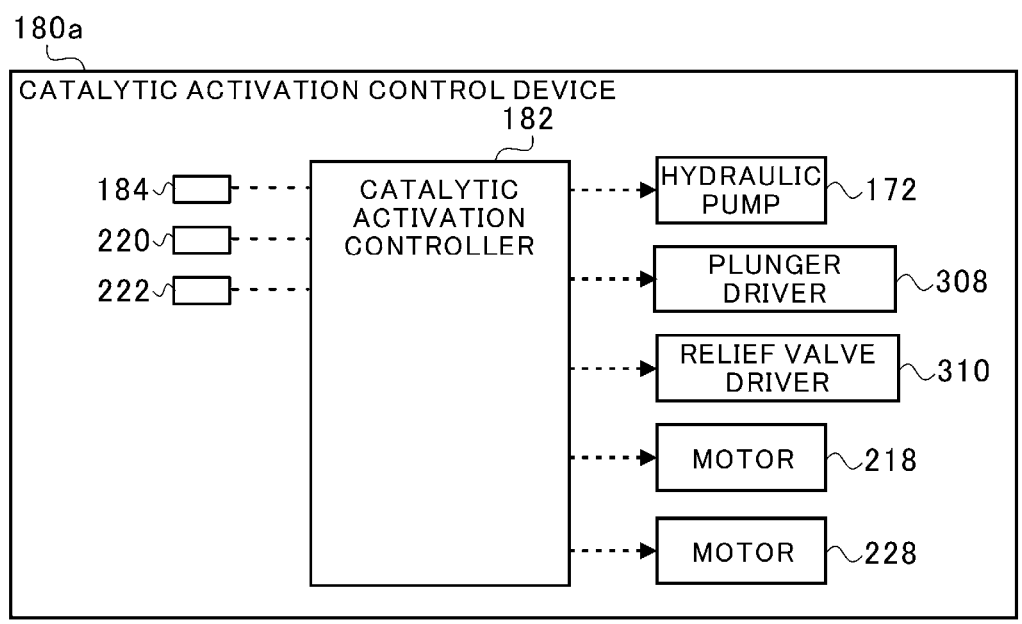
FIG. 3B is a functional block diagram for illustrating a catalytic activation control device in the modification example.

FIG. 3A and FIG. 3B are respectively a schematic configuration view and a schematic configuration diagram for illustrating a compression ratio varying mechanism Va and a catalyst activation control device 180a in a modification example. FIG. 3A is an extracted view for illustrating the coupling portion between the piston rod 114 and the crosshead pin 150 in the modification example. FIG. 3B is a functional block diagram for illustrating the catalyst activation control device 180a in the modification example.

The compression ratio varying mechanism Va includes the hydraulic chamber 154a and the large-diameter portion 114a of the piston rod 114. The compression ratio varying mechanism Va includes a hydraulic pressure adjustment mechanism Oa. The hydraulic pressure adjustment mechanism Oa includes the hydraulic pump 172, a swiveling pipe 302, a plunger pump 304, a relief valve 306, a plunger driver 308, and a relief valve driver 310.

The hydraulic pump 172 supplies the working oil supplied from the oil tank (not shown) to the swiveling pipe 302 based on an instruction from the catalyst activation controller 182. The swiveling pipe 302 is a pipe configured to connect the hydraulic pump 172 and the plunger pump 304 to each other. The swiveling pipe 302 is configured to be able to swivel between the plunger pump 304 moving together with the crosshead pin 150 and the hydraulic pump 172.

The plunger pump 304 is mounted to the crosshead pin 150. The plunger pump 304 includes a plunger 304a having a rod shape and a cylinder 304b having a tubular shape configured to slidably receive the plunger 304a.

The plunger pump 304 moves as the crosshead pin 150 moves so that the plunger 304a comes into contact with the plunger driver 308. The plunger pump 304 is slid in the cylinder 304b through the contact of the plunger 304a with the plunger driver 308, thereby increasing the pressure of the working oil in the cylinder 304b to supply the working oil increased in pressure to the hydraulic chamber 154a. A first check valve 304c is provided in an opening provided at an end of the cylinder 304b on a discharge side for the working oil. Further, a second check valve 304d is provided in an opening formed in a side peripheral surface of the cylinder 304b on a suction side.

The plunger driver 308 is driven to a contact position, which is brought into contact with the plunger 304a and a non-contact position, which is not brought into contact with the plunger 304a based on instructions from the catalyst activation controller 182. The plunger driver 308 comes into contact with the plunger 304a, to thereby press the plunger 304a toward the cylinder 304b.

The first check valve 304c is closed when a valve body is biased toward an inside of the cylinder 304b. When the first check valve 304c is closed, after the working oil has been supplied to the hydraulic chamber 154a, flowing back of the working oil into the cylinder 304b is suppressed. When a pressure of the working oil in the cylinder 304b becomes equal to or more than a biasing force (opening pressure) of a biasing member of the first check valve 304c, the valve body of the first check valve 304c is pushed by the working oil, thereby being opened.

The second check valve 304d is closed when a valve body is biased toward an outside of the cylinder 304b. When the second check valve 304d is closed, after the working oil has been supplied to the cylinder 304b, the flowing back of the working oil into the hydraulic pump 172 is suppressed. When the pressure of the working oil supplied from the hydraulic pump 172 becomes equal to or more than a biasing force (opening pressure) of a biasing member of the second check valve 304d, the valve body of the second check valve 304d is pushed by the working oil, thereby being opened. The opening pressure of the first check valve 304c is set to be higher than the opening pressure of the second check valve 304d.

The relief valve 306 is mounted to the crosshead pin 150. The relief valve 306 is connected to the hydraulic chamber 154a and the oil tank (not shown). The relief valve 306 includes a rod 306a having a rod shape, a main body 306b having a tubular shape, and a valve body 306c. The main body 306b is configured to slidably receive the rod 306a. An internal flow passage is formed inside the main body 306b. The working oil discharged from the hydraulic chamber 154a flows through the internal flow passage. The valve body 306c is arranged in the internal flow passage of the main body 306b.

The relief valve 306 is configured to move as the crosshead pin 150 moves so that the rod 306a comes into contact with the relief valve driver 310. The relief valve driver 310 is driven to a contact position, which is brought into contact with the rod 306a and a non-contact position, which is not brought into contact with the rod 306a based on instructions from the catalyst activation controller 182. The relief valve driver 310 comes into contact with the rod 306a, to thereby press the rod 306a toward the main body 306b. When the rod 306a is pressed toward the main body 306b, the rod 306a opens the valve body 306c. When the valve body 306c is opened, the working oil stored in the hydraulic chamber 154a is returned to the oil tank.

Each of the plunger driver 308 and the relief valve driver 310 includes a mechanism including a cam plate configured to perform operation control through, for example, a change in relative position to the plunger pump 304 or the relief valve 306. Each of the plunger driver 308 and the relief valve driver 310 includes a mechanism configured to use an actuator to drive the relative position of the cam plate.

In FIG. 3B, a configuration relating to control for the compression ratio varying mechanism Va is mainly illustrated. As illustrated in FIG. 3B, the catalyst activation control device 180a includes the catalyst activation controller 182. The catalyst activation control device 180a is formed of, for example, an engine control unit (ECU). The catalyst activation control device 180a is formed of a central processing unit (CPU), a ROM storing programs and the like, a RAM serving as a work area, and the like, and is configured to control the entire engine system 1.

The catalytic activation controller 182 is configured to control the hydraulic pump 172, the plunger driver 308, and the relief valve driver 310 based on the signal obtained from the pressure detection sensor 184 to move the top dead center position of the piston 112. The catalytic activation controller 182 is configured to control the geometric compression ratio of the engine 100. The catalytic activation controller 182 is configured to control the motor 218 based on the signals obtained from the temperature detection sensor 220 and the NOx detection sensor 222, to thereby control the opening degree of the bypass valve 216. The catalytic activation controller 182 is configured to control the amount of the urea water to be added to the exhaust gas (that is, to be supplied to the SCR device 214).

Incidentally, the SCR device 214 is less likely to react unless the temperature of the exhaust gas is equal to or higher than a predetermined temperature (for example, 300° C.). Therefore, at the time of operating the SCR device 214, when the temperature of the exhaust gas is lower than the predetermined temperature (first threshold value), it is required that the temperature of the exhaust gas be raised to be equal to or higher than the predetermined temperature.

As one of methods for raising the temperature of the exhaust gas, there is a method of lowering the scavenging pressure in the scavenging chamber 138a. Description is now given of the method for raising the temperature of the exhaust gas by lowering the scavenging pressure. When the scavenging pressure in the scavenging chamber 138a is lowered, the amount of the active gas to be introduced into the cylinder 110 (combustion chamber 128) is reduced. When the mixture of the fuel gas and the active gas is combusted in this state, due to the reduction in the amount of the active gas to be introduced, the combustion temperature is raised as compared to the state before the reduction in the amount of the active gas to be introduced. When the combustion temperature is raised, the temperature of the exhaust gas is also raised. As described above, the temperature of the exhaust gas can be raised by lowering the scavenging pressure.

However, in the case of lowering the scavenging pressure, the amount of the active gas to be introduced into the cylinder 110 (combustion chamber 128) is reduced. As a result, the combustion in the combustion chamber 128 is degraded, and efficiency of the engine 100 is lowered (that is, fuel efficiency is degraded).

In view of the above-mentioned circumstance, the catalytic activation controller 182 of this embodiment is configured to control the bypass valve 216 and the compression ratio of the combustion chamber 128 in order to improve the fuel efficiency of the engine 100 while raising the temperature of the exhaust gas at the time of operation of the SCR device 214. Here, in a normal state (that is, when processing of raising the temperature of the exhaust gas (hereinafter referred to as "catalytic activation processing") is not performed), the bypass valve 216 is controlled to a closed state so that the bypass flow passage is closed.

The catalytic activation controller 182 controls the bypass valve 216 to an open state in order to raise the temperature of the exhaust gas at the time of the operation of the SCR device 214. When the bypass valve 216 is controlled to the open state, part of the exhaust gas is introduced into the SCR device 214 through the bypass pipe 206 without passing through the turbine 208. Meanwhile, heat of the exhaust gas having flowed into the turbine 208 is removed at the time of rotating the turbine 208. Therefore, the exhaust gas which does not pass through the turbine 208 becomes higher in temperature as compared to the exhaust gas having passed through the turbine 208. The catalytic activation controller 182 is capable of raising the temperature of the exhaust gas by controlling the bypass valve 216 from the closed state to the open state.

Here, as the method for raising the temperature of the exhaust gas, it is also conceivable to employ a method of intentionally delaying a fuel injection timing of the pilot injection valve (not shown) besides the method of controlling the bypass valve 216 to the open state. In the case of performing the catalytic activation processing, the catalytic activation controller 182 may control the fuel injection timing of the pilot injection valve (not shown) to delay.

For example, the catalytic activation controller 182 may control the fuel injection timing of the pilot injection valve (not shown) such that the fuel injection timing becomes later in the case of performing the catalytic activation processing than in the case of not performing the catalytic activation processing. Specifically, in the case of not performing the catalytic activation processing, the catalytic activation controller 182 controls the fuel injection timing of the pilot injection valve (not shown) to a normal fuel injection timing (hereinafter referred to as "first fuel injection timing"). Meanwhile, in the case of performing the catalytic activation processing, the catalytic activation controller 182 controls the fuel injection timing of the pilot injection valve (not shown) to a fuel injection timing delayed by a predetermined time period from the normal fuel injection timing (hereinafter referred to as "second fuel injection timing").

The catalytic activation controller 182 may combine the control of the bypass valve 216 and the control of the fuel injection timing of the pilot valve (not shown). For example, in the case of performing the catalytic activation processing, the catalytic activation controller 182 may control the bypass valve 216 to the open state and control the fuel injection timing of the pilot injection valve (not shown) to delay.

When the bypass valve 216 is controlled to the open state, the flow rate of the exhaust gas to be supplied to the turbine 208 is reduced, and a rotation speed of the turbine 208 is lowered. When the rotation speed of the turbine 208 is lowered, a rotation speed of the compressor 210 is also lowered, and the amount of the active gas to be supplied to the scavenging chamber 138a is reduced. When the amount of the active gas to be supplied to the scavenging chamber 138a is reduced, the scavenging pressure in the scavenging chamber 138a is reduced, and the temperature of the exhaust gas is further raised as mentioned above.

Therefore, the catalytic activation controller 182 is capable of effectively raising the temperature of the exhaust gas by controlling the bypass valve 216 to the open state.

The catalytic activation controller 182 controls the bypass valve 216 to the open state, and at the same time, controls the compression ratio of the combustion chamber 128. In this embodiment, the control of the bypass valve 216 and the control of the compression ratio are performed at the same time. However, the present disclosure is not limited to such control, and the control of the compression ratio may be performed before or after the control of the bypass valve 216.

In this embodiment, the catalytic activation controller 182 is capable of varying the compression ratio within a range of from a minimum compression ratio $\varepsilon 0$ to a maximum compression ratio $\varepsilon n$ by driving the compression ratio varying mechanism V. Here, an upper limit value of the pressure in the cylinder 110 (hereinafter referred to as "cylinder internal-pressure upper limit value") is determined for the engine 100 in consideration of durability of the cylinder 110. Therefore, in the engine 100, when the maximum pressure in the cylinder 110 measured by the pressure detection sensor 184 in one combustion cycle is a maximum combustion pressure Pmax, it is required that the maximum combustion pressure Pmax be suppressed to be equal to or less than the cylinder internal-pressure upper limit value.

Here, the maximum combustion pressure Pmax becomes the highest at an engine full load (100% load) at which the engine load becomes the largest. Therefore, in the engine 100, the compression ratio of the combustion chamber 128 is usually set such that the maximum combustion pressure Pmax at the engine full load reaches the cylinder internal-pressure upper limit value.

The compression ratio varying mechanism V of this embodiment sets the compression ratio to the minimum compression ratio $\varepsilon 0$ so that the maximum combustion pressure Pmax reaches the cylinder internal-pressure upper limit value at the engine full load. In this embodiment, at the time of not performing the catalytic activation processing, the catalytic activation controller 182 controls the compression ratio of the combustion chamber 128 to reach the minimum compression ratio $\varepsilon 0$. That is, at the time of not performing the catalytic activation processing, the catalytic activation controller 182 fixes the compression ratio of the combustion chamber 128 to the minimum compression ratio $\varepsilon 0$ regardless of the engine load.

Meanwhile, at the time of starting the operation of the SCR device 214 (that is, at the time of performing the catalytic activation processing), the catalytic activation controller 182 controls the compression ratio of the combustion chamber 128 to a compression ratio larger than the minimum compression ratio $\varepsilon 0$. As the compression ratio is increased, the maximum combustion pressure Pmax also becomes larger. When the maximum combustion pressure Pmax becomes larger, the efficiency of the engine 100 also improves, thereby being capable of reducing a fuel consumption rate (that is, improving the fuel efficiency).

However, the cylinder internal-pressure upper limit value is determined for the engine 100. Therefore, in the case of increasing the compression ratio, the catalytic activation controller 182 controls the compression ratio so that the maximum combustion pressure Pmax does not exceed the cylinder internal-pressure upper limit value set in advance. As mentioned above, as the maximum combustion pressure Pmax becomes larger, the fuel efficiency can be improved. When the maximum combustion pressure Pmax reaches the cylinder internal-pressure upper limit value set in advance, the fuel efficiency can be most improved. In the case of increasing the compression ratio, the catalytic activation controller 182 controls the compression ratio (compression ratio varying mechanism V) so that the maximum combustion pressure Pmax approaches the cylinder internal-pressure upper limit value set in advance.

When the compression ratio is increased, the combustion temperature is also raised. When the combustion temperature is raised, the temperature of the exhaust gas is also raised. As described above, the catalytic activation controller 182 is capable of raising the temperature of the exhaust gas by increasing the compression ratio to be larger than the minimum compression ratio $\varepsilon 0$.

In such a manner, at the time of operating the SCR device 214, the catalytic activation controller 182 controls the opening degree of the bypass valve 216 and the compression ratio of the combustion chamber 128, thereby being capable of improving the fuel efficiency of the engine 100 while raising the temperature of the exhaust gas.

Figure 4:
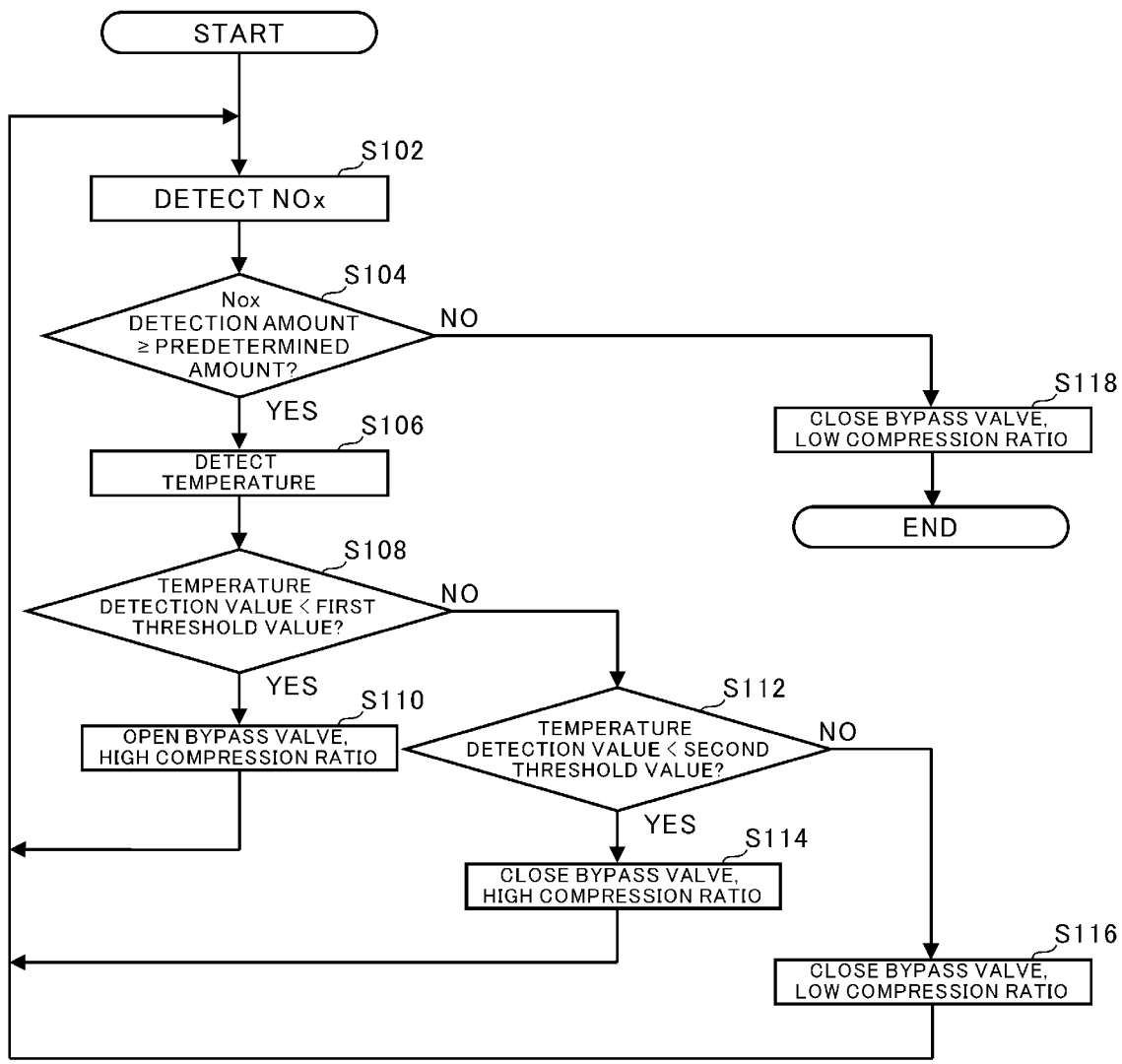
FIG. 4 is a flowchart for illustrating catalytic activation processing in this embodiment.

FIG. 4 is a flowchart for illustrating the catalytic activation processing in this embodiment.

First, the catalytic activation controller 182 detects a current amount of NOx based on a signal output from the NOx detection sensor 222 (Step S102). Next, the catalytic activation controller 182 determines whether or not the detected amount of NOx (hereinafter referred to as "NOx detection amount") is equal to or larger than a predetermined amount (Step S104). When the NOx detection amount is equal to or larger than the predetermined amount (YES in Step S104), the catalytic activation controller 182 proceeds to Step S106. Meanwhile, when the NOx detection amount is smaller than the predetermined amount (NO in Step S104), the catalytic activation controller 182 proceeds to Step S118.

When it is determined "YES" in Step S104, the NOx detection amount is equal to or larger than the predetermined amount. Thus, the catalytic activation controller 182 starts the operation of the SCR device 214 to reduce the amount of the NOx. At the time of starting the operation of the SCR device 214, the catalytic activation controller 182 detects the temperature of the exhaust gas based on the signal output from the temperature detection sensor 220 (Step S106). Here, the catalytic activation controller 182 may estimate the temperature of the SCR device 214 based on the detected temperature of the exhaust gas. Moreover, when the temperature detection sensor 220 is provided to the SCR device 214, the catalytic activation controller 182 may detect the temperature of the SCR device 214 based on the signal output from the temperature detection sensor 220.

The catalytic activation controller 182 compares a value of the detected temperature (hereinafter referred to as "temperature detection value") and the first threshold value (for example, 300° C.) to determine whether or not the temperature detection value is smaller than the first threshold value (Step S108). When the temperature detection value is smaller than the first threshold value (YES in Step S108), the routine proceeds to Step S110. When the temperature detection value is equal to or larger than the first threshold value (NO in Step S108), the routine proceeds to Step S112.

When it is determined "YES" in Step S108, the temperature of the SCR device 214 is lower than 300° C. (lower than the catalytic activation temperature). Thus, the catalytic activation controller 182 performs the processing of raising the temperature of the exhaust gas in order to raise the temperature of the SCR device 214. That is, the catalytic activation controller 182 controls the bypass valve 216 to the open state and controls the compression ratio of the combustion chamber 128 to a high compression ratio (Step S110). Here, the high compression ratio is the maximum compression ratio εn or a compression ratio at which the maximum combustion pressure Pmax is closest to the cylinder internal-pressure upper limit value set in advance. However, the high compression ratio is not limited to the compression ratio mentioned above and may be a compression ratio larger than the minimum compression ratio ε0.

When it is determined "NO" in Step S108, the catalytic activation controller 182 compares the temperature detection value and a second threshold value (for example, a maximum allowable temperature of the SCR device 214) to determine whether or not the temperature detection value is smaller than the second threshold value (Step S112). Here, the second threshold value is a value larger than the first threshold value, and is, for example, a temperature exceeding the catalytic activation temperature of the SCR device 214 or the maximum allowable temperature set in advance to the SCR device 214. When the temperature detection value is smaller than the second threshold value (YES in Step S112), the routine proceeds to Step S114. When the temperature detection value is equal to or larger than the second threshold value (NO in Step S112), the routine proceeds to Step S116.

When it is determined "YES" in Step S112, the temperature of the SCR device 214 corresponds to a temperature (catalytic activation temperature) equal to or higher than 300° C. and lower than the maximum allowable temperature. Thus, the catalytic activation controller 182 performs the processing of improving the fuel efficiency of the engine 100. That is, the catalytic activation controller 182 controls the bypass valve 216 to the closed state, and controls (maintains) the compression ratio of the combustion chamber 128 to (at) the high compression ratio (Step S114). In Step S114, the temperature detection value is equal to or larger than 300° C. Thus, the rise in temperature of the exhaust gas is suppressed by controlling the bypass valve 216 to the closed state.

Here, when the bypass valve 216 is brought into the closed state, the exhaust gas passing through the bypass pipe 206 flows into the turbine 208. Thus, the flow rate of the exhaust gas passing through the turbine 208 increases. When the flow rate of the exhaust gas passing through the turbine 208 increases, the rotation speed of the turbine 208 is raised, and the rotation speed of the compressor 210 is also raised. with this, the scavenging pressure is raised, and the maximum combustion pressure Pmax in the combustion chamber 128 becomes larger. As a result, the efficiency of the engine 100 is improved (the fuel efficiency is improved).

However, when the bypass valve 216 is brought into the closed state, the exhaust gas flows into the turbine 208, and heat is removed by rotation of the turbine 208. Therefore, there is a fear in that the temperature of the SCR device 214 is lowered to be lower than 300° C. Thus, it is preferred that the catalytic activation controller 182 control the bypass valve 216 to the closed state and control the compression ratio of the combustion chamber 128 to the high compression ratio. Through the control of the compression ratio of the combustion chamber 128 to the high compression ratio, the temperature of the exhaust gas can be raised, thereby being capable of suppressing the reduction in temperature of the exhaust gas having passed through the turbine 208.

When it is determined "NO" in Step S112, the temperature of the SCR device 214 is equal to or higher than the maximum allowable temperature. Thus, the catalytic activation controller 182 performs the processing of lowering the temperature of the exhaust gas in order to lower the temperature of the SCR device 214. That is, the catalytic activation controller 182 controls the bypass valve 216 to the closed state and controls the compression ratio of the combustion chamber 128 to a low compression ratio (Step S116). Here, the low compression ratio is the minimum compression ratio ε0. However, the low compression ratio is not limited to the compression ratio mentioned above and may be a compression ratio smaller than the maximum compression ratio εn or a compression ratio smaller than the compression ratio at which the maximum combustion pressure Pmax is the closest to the cylinder internal-pressure upper limit value set in advance. Through the operation of bringing the bypass valve 216 into the closed state and controlling the compression ratio of the combustion chamber 128 to the low compression ratio, the temperature of the exhaust gas can be lowered to be lower than the maximum allowable temperature.

When it is determined "NO" in Step S104, the NOx detection amount is smaller than the predetermined amount.

Thus, the catalytic activation controller 182 terminates the operation of the SCR device 214. That is, the catalytic activation controller 182 controls the bypass valve 216 to the closed state and controls the compression ratio of the combustion chamber 128 to the low compression ratio (Step S118), and terminates the catalytic activation processing.

Figure 5:
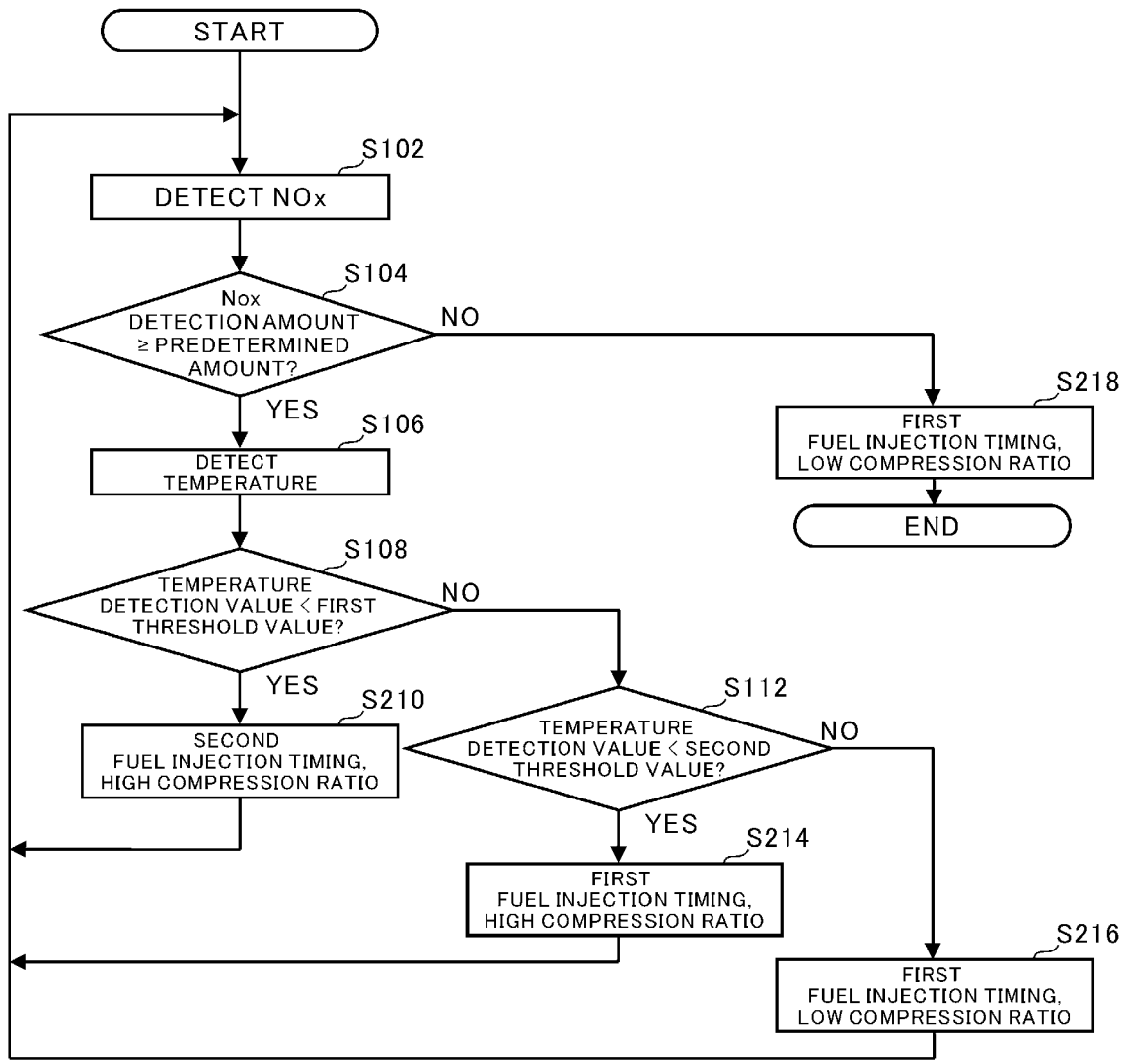
FIG. 5 is a flowchart for illustrating catalytic activation processing in a modification example.

FIG. 5 is a flowchart for illustrating catalytic activation processing in a modification example. The catalytic activation processing in this modification example controls the fuel injection timing of the pilot injection valve (not shown) instead of controlling the bypass valve 216, unlike the embodiment described above. Therefore, the catalytic activation processing in this modification example includes Steps S210, S214, S216, and S218 illustrated in FIG. 5 in place of Steps S110, S114, S116, and S118 illustrated in FIG. 4. Description is now given of the catalytic activation processing in this modification example.

First, the catalytic activation controller 182 detects the current amount of NOx based on the signal output from the NOx detection sensor 222 (Step S102). Next, the catalytic activation controller 182 determines whether or not the NOx detection amount is equal to or larger than a predetermined amount (Step S104). When the NOx detection amount is equal to or larger than the predetermined amount (YES in Step S104), the catalytic activation controller 182 proceeds to Step S106. Meanwhile, when the NOx detection amount is smaller than the predetermined amount (NO in Step S104), the catalytic activation controller 182 proceeds to Step S218.

When it is determined "YES" in Step S104, the NOx detection amount is equal to or larger than the predetermined amount. Thus, the catalytic activation controller 182 starts the operation of the SCR device 214 to reduce the amount of the NOx. At the time of starting the operation of the SCR device 214, the catalytic activation controller 182 detects the temperature of the exhaust gas based on the signal output from the temperature detection sensor 220 (Step S106).

The catalytic activation controller 182 compares a temperature detection value and the first threshold value (for example, 300° C.) to determine whether or not the temperature detection value is smaller than the first threshold value (Step S108). When the temperature detection value is smaller than the first threshold value (YES in Step S108), the routine proceeds to Step S210. When the temperature detection value is equal to or larger than the first threshold value (NO in Step S108), the routine proceeds to Step S112.

When it is determined "YES" in Step S108, the temperature of the SCR device 214 is lower than 300° C. (lower than the catalytic activation temperature). Thus, the catalytic activation controller 182 performs the processing of raising the temperature of the exhaust gas in order to raise the temperature of the SCR device 214. That is, the catalytic activation controller 182 controls the fuel injection timing of the pilot injection valve (not shown) to the second fuel injection timing and controls the compression ratio of the combustion chamber 128 to the high compression ratio (Step S210).

When it is determined "NO" in Step S108, the catalytic activation controller 182 compares the temperature detection value and the second threshold value (for example, the maximum allowable temperature of the SCR device 214) to determine whether or not the temperature detection value is smaller than the second threshold value (Step S112). When the temperature detection value is smaller than the second threshold value (YES in Step S112), the routine proceeds to Step S214. When the temperature detection value is equal to or larger than the second threshold value (NO in Step S112), the routine proceeds to Step S216.

When it is determined "YES" in Step S112, the temperature of the SCR device 214 corresponds to a temperature (catalytic activation temperature) equal to or higher than 300° C. and lower than the maximum allowable temperature. Thus, the catalytic activation controller 182 performs the processing of improving the fuel efficiency of the engine 100. That is, the catalytic activation controller 182 controls the fuel injection timing of the pilot injection valve (not shown) to the first fuel injection timing and controls (maintains) the compression ratio of the combustion chamber 128 to (at) the high compression ratio (Step S214). In Step S214, the temperature detection value is equal to or larger than 300° C. Thus, the rise in temperature of the exhaust gas is suppressed by controlling the fuel injection timing of the pilot injection valve (not shown) to the first fuel injection timing.

When it is determined "NO" in Step S112, the temperature of the SCR device 214 is equal to or higher than the maximum allowable temperature. Thus, the catalytic activation controller 182 performs the processing of lowering the temperature of the exhaust gas in order to lower the temperature of the SCR device 214. That is, the catalytic activation controller 182 controls the fuel injection timing of the pilot injection valve (not shown) to the first fuel injection timing and controls the compression ratio of the combustion chamber 128 to the low compression ratio (Step S216). Through the operation of setting the fuel injection timing of the pilot injection valve (not shown) to the first fuel injection timing and controlling the compression ratio of the combustion chamber 128 to the low compression ratio, the temperature of the exhaust gas can be lowered to be lower than the maximum allowable temperature.

When it is determined "NO" in Step S104, the NOx detection amount is smaller than the predetermined amount. Thus, the catalytic activation controller 182 terminates the operation of the SCR device 214. That is, the catalytic activation controller 182 controls the fuel injection timing of the pilot injection valve (not shown) to the first fuel injection timing and controls the compression ratio of the combustion chamber 128 to the low compression ratio (Step S218), and terminates the catalytic activation processing.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

For example, in the above-mentioned embodiment, description is given of the two-cycle type, uniflow scavenging type, and crosshead type engine 100 as examples. However, the type of the engine is not limited to the two-cycle type, the uniflow scavenging type, and the crosshead type. It is only required that the present disclosure be applied to an engine. Moreover, in the above-mentioned embodiment, description is given of the example in which the gas fuel (fuel gas) is supplied to the inside of the cylinder 110 (combustion chamber 128). However, the configuration is not limited to this example, and a liquid fuel may be supplied to the inside of the cylinder 110 (combustion chamber 128). Moreover, the engine 100 may be, for example, of a dual fuel type, which chooses a gas fuel or a liquid fuel to be used. Moreover, the engine 100 is not limited to an engine for a boat, and may be an engine for, for example, an automobile.

In the above-mentioned embodiment, description is given of the example in which, when the temperature detected by the temperature detection sensor 220 is equal to or larger than the first threshold value and smaller than the second threshold value, the catalytic activation controller 182 controls the compression ratio of the combustion chamber 128 to the high compression ratio. However, the present disclosure is not limited to this example. The catalytic activation controller 182 may control the compression ratio of the combustion chamber 128 to the low compression ratio when the temperature detected by the temperature detection sensor 220 is equal to or larger than the first threshold value and smaller than the second threshold value.

In the above-mentioned embodiment, description is given of the example in which, when the temperature detected by the temperature detection sensor 220 is equal to or larger than the first threshold value and smaller than the second threshold value, the catalytic activation controller 182 maintains the compression ratio given in the case in which the temperature is smaller than the first threshold value. However, the present disclosure is not limited to this example. The catalytic activation controller 182 may change the compression ratio given in the case in which the temperature is smaller than the first threshold value when the temperature detected by the temperature detection sensor 220 is equal to or larger than the first threshold value and is smaller than the second threshold value. For example, when the operation condition (engine load) is equal, the catalytic activation controller 182 may change the compression ratio given in the case in which the temperature detected by the temperature detection sensor 220 is smaller than the first threshold value to be higher than the compression ratio given in the case in which the temperature is equal to or larger than the first threshold value. Moreover, when the operation condition (engine load) is equal, the compression ratio given in the case in which the temperature detected by the temperature detection sensor 220 is smaller than the first threshold value and in the case in which the temperature is equal to or larger than the first threshold value and smaller than the second threshold value may be set higher than the compression ratio given in the case in which the temperature is equal to or larger than the second threshold value.

INDUSTRIAL APPLICABILITY

The present disclosure can be applied to the engine system.

What is claimed is:

1. An engine system, comprising:
a combustion chamber to which an intake flow passage and an exhaust flow passage are connected;
an exhaust gas purification catalyst provided to the exhaust flow passage;
a turbocharger including:
a turbine arranged on the exhaust flow passage; and
a compressor arranged on the intake flow passage;
a bypass flow passage for connecting an upstream side and a downstream side of the turbine on the exhaust flow passage;
a bypass valve configured to open and close the bypass flow passage;
a detector configured to detect a temperature of the exhaust gas purification catalyst, and
a controller configured to control the bypass valve and a compression ratio of the combustion chamber,
wherein, when the temperature of the exhaust gas purification catalyst is smaller than a first threshold value, the controller controls the bypass valve to an open state and controls the compression ratio to a high compression ratio larger than a minimum compression ratio, and
when the temperature of the exhaust gas purification catalyst is equal to or larger than the first threshold value, the controller controls the bypass valve to a closed state and maintains the high compression ratio.

2. The engine system according to claim 1, further comprising a compression ratio varying mechanism configured to change a top dead center position of a piston in a cylinder.

3. The engine system according to claim 1, wherein, when the temperature of the exhaust gas purification catalyst is equal to or larger than a second threshold value larger than the first threshold value, the controller controls the bypass valve to a closed state and controls the compression ratio to a low compression ratio smaller than the high compression ratio.

4. The engine system according to claim 1,
wherein, when the temperature of the exhaust gas purification catalyst is smaller than a the first threshold value, the controller controls a fuel injection timing to a second fuel injection timing later than a first fuel injection timing.

5. The engine system according to claim 4, wherein, when the temperature of the exhaust gas purification catalyst is equal to or larger than the first threshold value, the controller controls the fuel injection timing to the first fuel injection timing and maintains the high compression ratio.

6. The engine system according to claim 5, wherein, when the temperature of the exhaust gas purification catalyst is equal to or larger than a second threshold value larger than the first threshold value, the controller controls the fuel injection timing to the first fuel injection timing and controls the compression ratio to a low compression ratio smaller than the high compression ratio.

7. The engine system according to claim 4, wherein, when the temperature of the exhaust gas purification catalyst is equal to or larger than a second threshold value larger than the first threshold value, the controller controls the fuel injection timing to the first fuel injection timing and controls the compression ratio to a low compression ratio smaller than the high compression ratio.

* * * * *

UNITED STATES PATENT AND TRADEMARK OFFICE
CERTIFICATE OF CORRECTION

| | |
|---|---|
| PATENT NO. | : 11,306,649 B2 |
| APPLICATION NO. | : 17/080349 |
| DATED | : April 19, 2022 |
| INVENTOR(S) | : Masuda et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 24 days.

Signed and Sealed this
Fifth Day of December, 2023

Katherine Kelly Vidal
*Director of the United States Patent and Trademark Office*